O. W. BRITT.
VEHICLE TIRE.
APPLICATION FILED APR. 21, 1913.
1,103,478.
Patented July 14, 1914.
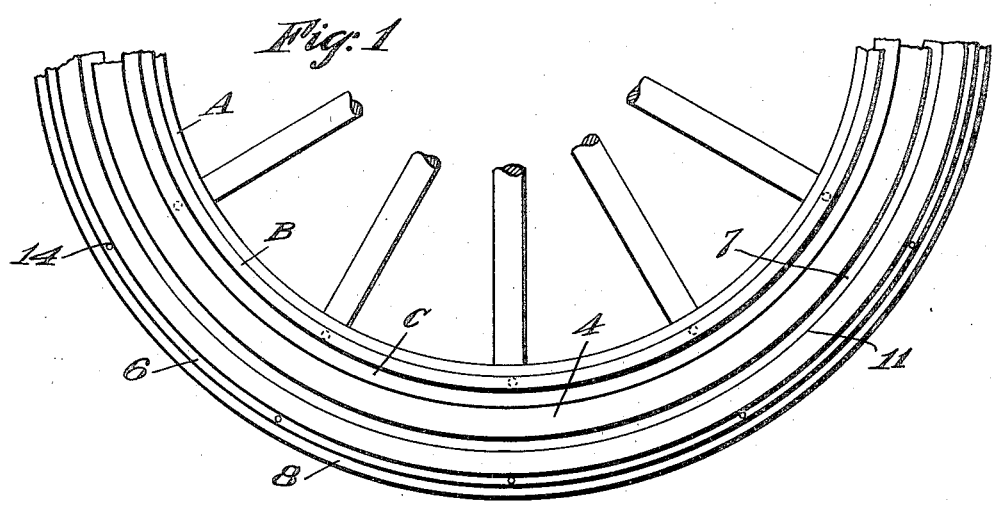
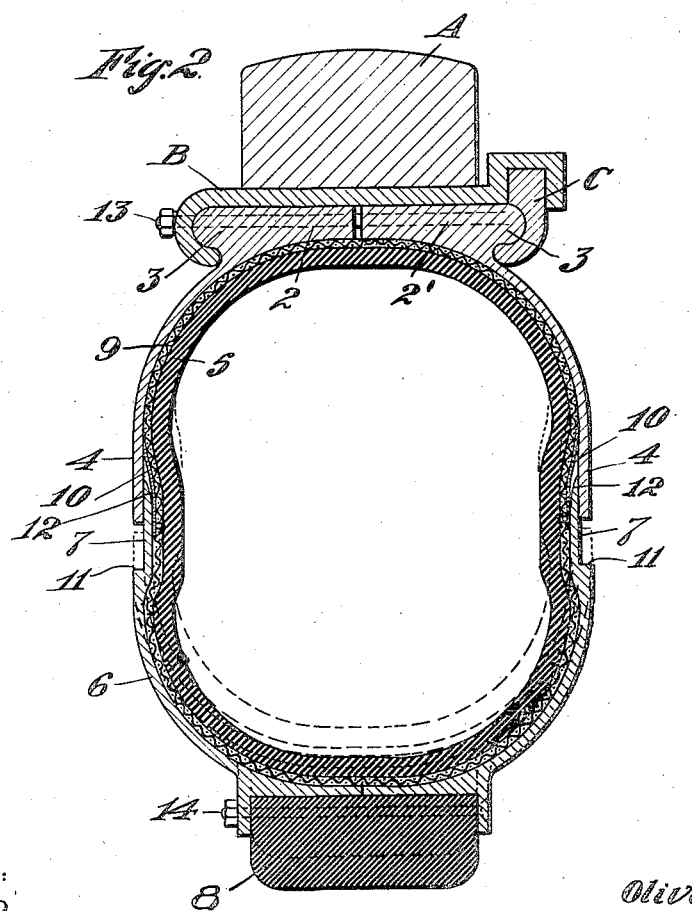
WITNESSES:
INVENTOR
Oliver W. Britt,
BY G. H. Strong.
ATTORNEY

UNITED STATES PATENT OFFICE.

OLIVER W. BRITT, OF SAN FRANCISCO, CALIFORNIA.

VEHICLE-TIRE.

1,103,478.    Specification of Letters Patent.    Patented July 14, 1914.

Application filed April 21, 1913. Serial No. 762,524.

*To all whom it may concern:*

Be it known that I, OLIVER W. BRITT, a citizen of the United States, residing in the city and county of San Francisco and State of California, have invented new and useful Improvements in Vehicle-Tires, of which the following is a specification.

This invention relates to a tire for vehicle wheels.

It is the object of this invention to provide a resilient tire for vehicle wheels which is puncture-proof, capable of hard wear, cheap of manufacture, and readily applied to and removed from the wheel rims.

A further object is to provide a tire in which a pneumatic tube is employed to obtain the desired resiliency, and in which a puncture-proof casing is provided for said tube so mounted as to permit of the resilient operations of the tube, which casing is adapted to serve as a solid rim in event the tube should become deflated, thus enabling the vehicle being run without immediate inflation of the tire, without danger of damaging the tire or wheel rim. Further objects will appear hereinafter.

The invention primarily resides in a pair of annular members adapted to be removably attached to the ordinary wheel rims to form a combined seat and guide, an inflatable tube seated on said members, and an annular casing surrounding the periphery of the inflatable tube having slidable connection with the guide members and adapted to have a limited reciprocal movement in relation thereto.

The invention further consists of the parts and the construction and combination of parts as hereinafter more fully described and claimed, having reference to the accompanying drawings, in which—

Figure 1 is a fragmentary view of the lower portion of a vehicle wheel constructed in accordance with this invention. Fig. 2 is an enlarged detail section of the tire and wheel rim.

In the drawings A represents the wheel felly and B indicates the ordinary clincher rim attached to the felly A. The essence of this invention resides in a pair of annular metallic members 2 and 2', formed with beads 3 on their outer peripheral edges, adapted to be engaged by the wheel rim B in the manner commonly employed in mounting pneumatic tires; the members 2 and 2' being formed with outwardly extending portions 4 on their outer edges adjacent the beads 3. The members 2 and 2' form a detachable seat for a pneumatic tube 5 of any suitable description, which is mounted between the outwardly extending portions 4 of the members 2 and securely retained against lateral movement thereby; the flange portions 4 of the members 2 extending outwardly sufficiently far to approximately cover the inner half of the tube 5, when the latter is inflated.

An annular metallic casing 6, segmental or U-shaped in cross section, and having offset flanged portions 7 on its inner periphery, is mounted on the outer periphery of the inflatable tube, 5, with the flange portions 7 in slidable engagement with the inner walls of the extended portions 4 on the members 2. This casing may be formed either in one or two pieces, and may have a tread 8 of any suitable description mounted on its outer periphery. Interposed between the inflatable tube 5 and the inner walls of the tread casing 6 and the seat members 2 is a fabric lining 9, which surrounds the tube 5 and has a pair of annular thin metallic sealing plates 10 on its diametrically opposite sides, so disposed as to overlap the joint between the tire seat and the tread casing. The plates 10 are attached at their outer peripheral edges to the lining 9, and have sufficient flexibility to permit their inner edges being pressed tight against the walls of the extensions 4 when the tube 5 is inflated under pressure.

In applying the tire to the wheel rim B, the member 2 is first placed in position on the wheel rim. The tube 5, with the fabric lining 9 therearound, is then placed within the casing 6 and partially inflated. The casing 6 with the tube 5 therein is then placed with the flange 7 on one of its edges, bearing against the inner face of the extension 4 on the member 2. The member 2' is then placed in position on the wheel rim B with the inner face of its extension 4 abutting against the outer face of the flange 7 on the other edge of the casing 6; the member 2' being locked against displacement on the wheel rim B by means of a detachable rim C in the manner commonly employed in attaching pneumatic tires to demountable wheel rims. The tube 5 may then be inflated to the desired extent, in any suitable manner; it being manifest, however, that the tube 5 may be inflated nearly to the desired extent prior to the application of the member 2', if desired. When the parts are thus assembled, they will be positioned as shown in Fig. 2, with the flanges 7 on the casing 6 bearing against the inner walls of the extensions 4 on the seat members 2 and 2'; the lining 9 surrounding the tube 5 contacting the inner surfaces of the casing 6 and the members 2 and 2', and the plates 10 covering the ends of the flanges 7. The casing 6 is formed with annular shoulders 11 at the bases of the flanges 7, which shoulders are spaced sufficiently far from the outer ends of the extensions 4 to permit of a limited transverse or vertical movement of the casing 6 in relation to the members 2.

The outer ends of the flanges 7 are beveled or tapered, as indicated at 12, in such manner that when the casing 6 is caused to move in and out in relation to the members 2 and 2' the edges of the flanges 7 will ride easily between the walls of the extensions 4 and the plates 10, so as to permit the latter being pressed tightly against the extensions 4 and thereby form a tight joint at this point. When the tube 5 is inflated the pressure thereof against the members 2 and 2' of the casing 6 is sufficient to hold these members against rotation in relation to each other and the wheel rim B.

In some instances it may be desirable to fasten the members 2 and 2' to the rim B, independent of the detachable rim C. This may be accomplished by means of bolts 13.

The tread 8 is preferably adapted to be removed for which reason it is secured to the casing 6 by bolts 14 which may also serve to secure the two parts of the casing 6 together when the latter is so constructed.

Having thus described my invention, what I claim and desire to secure by Letters Patent is:

In a resilient tire for vehicle wheels, a pair of annular metallic members connected to the wheel rim, said members conjointly forming a substantially U-shaped seat in cross-section, an inflatable tube in said seat, a casing which is of U-shape in cross-section surrounding the outer portion of the tube, the free side portions of the casing having offset flanged portions which flanges provide shoulders that are for engagement with the free side edges of said members, said shoulders being normally spaced from the free side edges of said members and said flanged portions extending across and covering said space and being slidably engaged with the respective inner faces of the free side portions of said members, the free edge portions of the flange portions on the inner faces of the latter being outwardly tapered, a lining in the seat and casing surrounding the tube, and a pair of thin flexible metal plates affixed to diametrically opposed points on the lining periphery and being arranged to extend over and beyond the extremities of said tapered edges of the flanged parts and to engage the respective inner faces of said members.

In testimony whereof I have hereunto set my hand in the presence of two subscribing witnesses.

OLIVER W. BRITT.

Witnesses:
JOHN H. HERRING,
W. W. HEALEY.